United States Patent
Matsco et al.

(10) Patent No.: US 6,432,332 B1
(45) Date of Patent: Aug. 13, 2002

(54) AUTOMOTIVE WINDOW HAVING A MASKING BORDER AND PROCESS FOR PRODUCING AN AUTOMOTIVE WINDOW PANEL MASKING BORDER

(75) Inventors: Mark M. Matsco, South Lyon; Barry B. Hoult, Ann Arbor; David Kusuma, Canton, all of MI (US)

(73) Assignee: Exatec, LLC., Wixon, MI (US)

( * ) Notice: Subject to any disclaimer, the term of this patent is extended or adjusted under 35 U.S.C. 154(b) by 0 days.

(21) Appl. No.: 09/687,304

(22) Filed: Oct. 13, 2000

Related U.S. Application Data

(60) Provisional application No. 60/159,250, filed on Oct. 13, 1999.

(51) Int. Cl.[7] .......................... B29C 33/42; B29C 39/02
(52) U.S. Cl. ......................... 264/39; 264/219; 264/299
(58) Field of Search .......................... 264/39, 219, 299

(56) References Cited

U.S. PATENT DOCUMENTS 6,124,886 A * 9/2000 Deline et al. ............... 348/148
6,159,397 A * 12/2000 Friedman ................... 264/1.7

* cited by examiner

Primary Examiner—Allan R. Kuhns
(74) Attorney, Agent, or Firm—John R. Benefiel

(57) ABSTRACT

A molded plastic window panel for automotive glazing in which texturized surfaces are molded into the perimeter of the panel to define a translucent masking border. A pattern of discrete texturized areas is adjacent a solid texturized band to provide a fade out effect. The window panel is molded from polycarbonate to block UV light transmission through the translucent masking border to protect an adhesive bond or seal used to seal the window panel in an automotive body window opening.

5 Claims, 2 Drawing Sheets

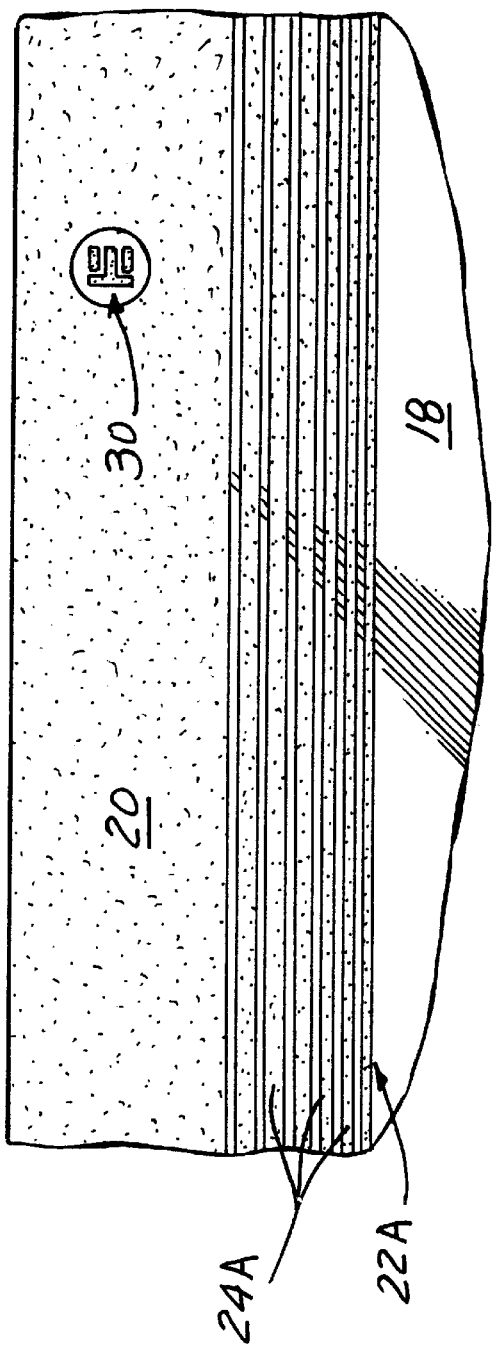
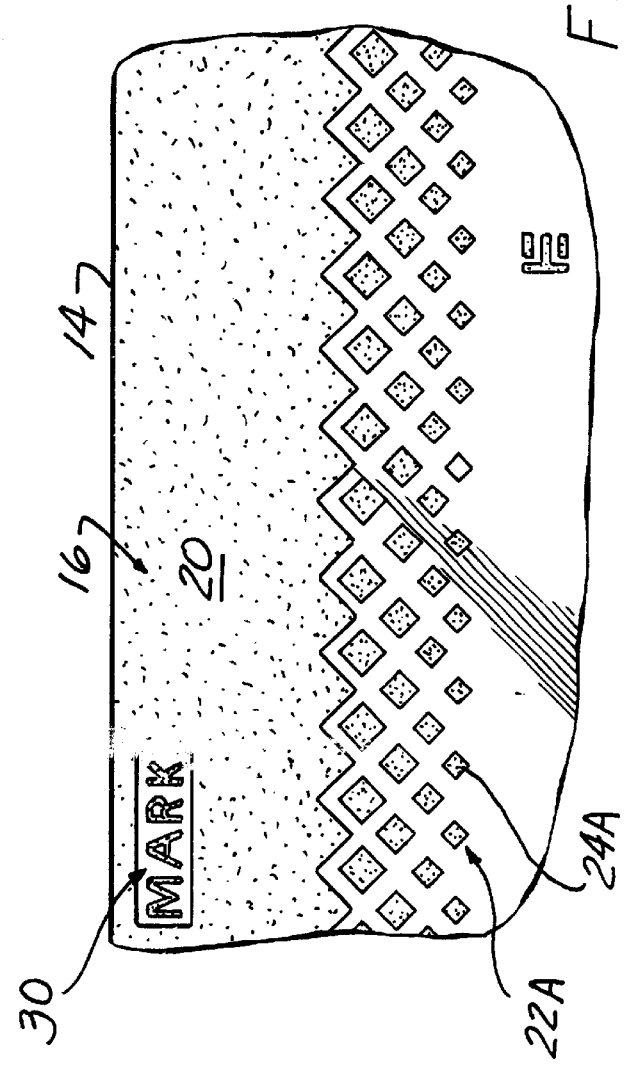

US 6,432,332 B1

AUTOMOTIVE WINDOW HAVING A MASKING BORDER AND PROCESS FOR PRODUCING AN AUTOMOTIVE WINDOW PANEL MASKING BORDER

CROSS REFERENCE TO RELATED APPLICATIONS

This application claims the benefit of the filing date of provisional application 60/159,250, filed on Oct. 13, 1999.

BACKGROUND OF THE INVENTION

This invention concerns windows for automotive vehicles. Modern vehicles often include fixed glass glazing panels which are fixedly mounted in a window in the body structure by an adhesive bonding. This joint must be masked to protect the adhesive from UV radiation in sunlight, and also to conceal the joint details for aesthetic reasons.

A painted or imprinted black out band extending about the window perimeter has been widely employed to provide such masking, as it blocks any penetration by UV light to protect the adhesive from degeneration due to UV exposure. Such black out border has also included a "fade out" treatment adjacent the solid border to further improve the aesthetic appeal of the masking.

Such masking border treatment has also been employed on movable flip out windows, which mate with an elastomeric seal.

It has long been proposed to provide molded plastic window panels for automotive glazing applications since reduced weight, improved safety and greater design freedom can be achieved. The development of durable hard coating technology has made the use of molded plastics such as polycarbonate practical for use in automotive window panels.

The object of the present invention is to provide an improved process for providing a masking border treatment for such automotive window panels constructed of molded plastic glazing.

SUMMARY OF THE INVENTION

The above object and others which will become apparent upon a reading of the following specification and claims are achieved by providing a masking treatment comprised of a translucent texturized surface extending around the perimeter of a molded plastic glazing panel by texturizing the corresponding mold surface areas. The texture distorts light passing through the masking border sufficiently so that this texturizing is created viewing anything overlain by the border is prevented, and thus effectively masked from view. The texturizing of the mold surface creates a surface appearance such as by etching or sand blasting. The texturing may be either fine grained to produce a frosting or more coarsely grained as long as it sufficiently distorts the light transmitted therethrough to render unviewable the details of any structure overlain by the masking border.

A plastic such as polycarbonate is preferably employed to mold the window panel, which material blocks UV light transmission through the translucent border to protect an adhesive used to mount the window panel in the body structure.

The remaining main section of the panel has smooth surface (produced by polished mold surfaces) to provide an optically true quality in which a clear view therethrough is obtained.

A fade out treatment is provided by a pattern of spaced apart small areas of texturizing, the areas of decreasing size with increasing distances from the solid band of texturizing.

A logo or other legend may be generated by the same texturizing process either within the border or adjacent thereto.

BRIEF DESCRIPTION OF THE DRAWINGS

FIG. 2 is a fragmentary enlarged view of a molded plastic window panel having a masking border treatment according to the present invention.

FIG. 3 is a fragmentary enlarged view of a second embodiment of the present invention;

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
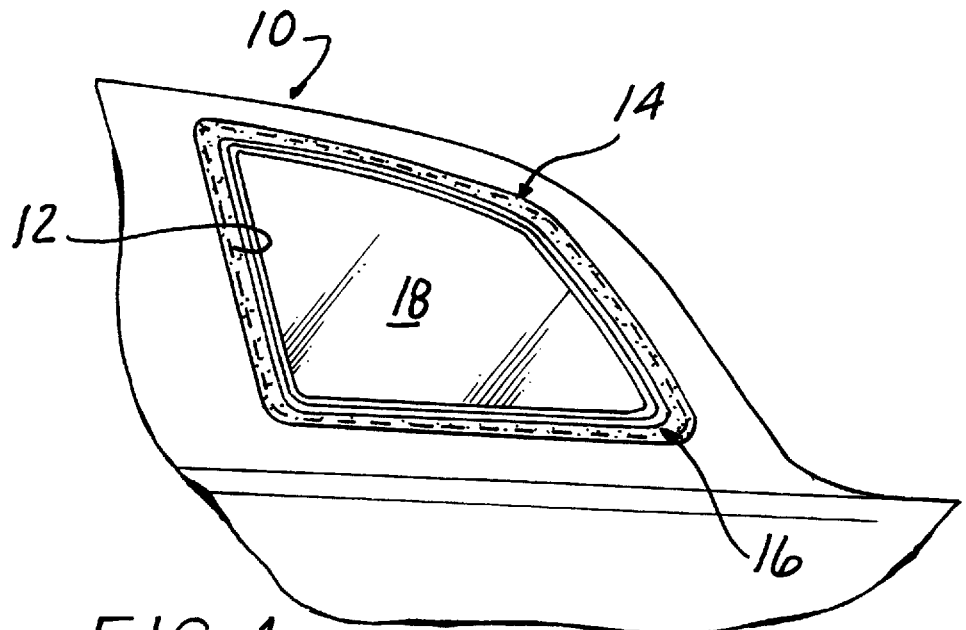
FIG. 1 is a fragmentary side elevational view of an automotive body having a molded plastic window panel installed in a window opening defined in the body structure.

Referring to FIG. 1, a portion of an automotive vehicle body 10 is shown defining a window opening 12, in which a generally planar molded plastic window panel 14 is installed. The window panel 14 overlies the adjacent body structure with an adhesive bond or other suitable joint fixing the same in position. Alternatively, a flip out mounting with a seal may also be employed.

A translucent masking border 16 extends about the perimeter of the window panel 14 to conceal the adhesive or seal joint in the manner generally known in the art.

An optically unobscured main section 18 of the window panel 14 lies within the border to allow normal unobstructed viewing therethrough in the normal fashion.

FIG. 2 shows further details. The masking border 14 includes a solid texturized band 20 around the outermost region of the perimeter of the panel. A fade out region 22 is also included to the inside of the solid band 20. The fade out region 22 comprises a pattern of small texturized areas 24, of progressively decreasing smaller size with increasing distances inwardly from the solid band 20.

The areas may be of regular geometric shape, such as the diamonds 24 of FIG. 2 or the narrow stripes of FIG. 3.

Other patterns are shown in copending design application U.S. Ser. No. 29/122,082, filed Apr. 19, 2000.

Figure 4:
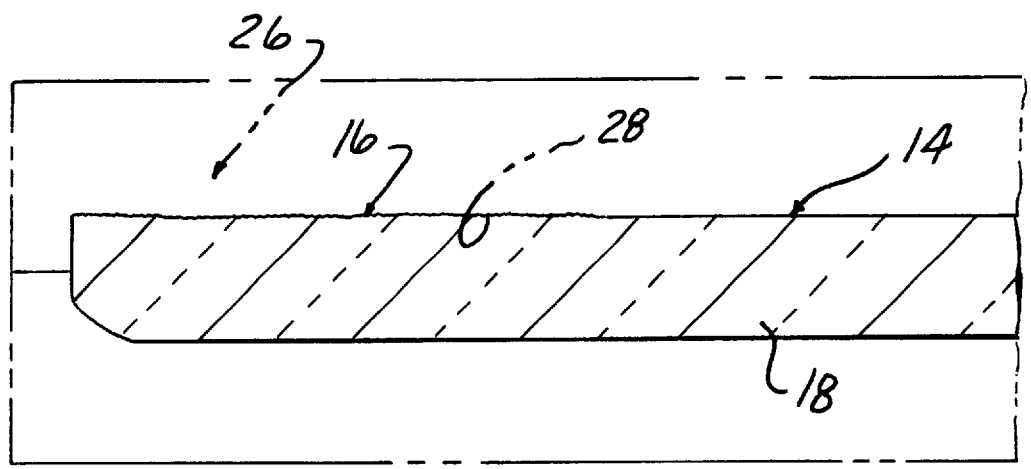
FIG. 4 is a fragmentary sectional view of a window panel with a phantom line representation of a corresponding mold structure.

FIG. 4 depicts (in phantom lines) a mold 26 in which the window panel 14 is injection molded. The mold surfaces 28 corresponding to the masking border 16 are texturized, as by etching, sand blasting, etc. to create the complementary surface texture in the window panel 14. This texturizing also facilitates part removal from the mold, as there is a lessened tendency to create a vacuum between the mold and part.

The texturized area 16 may also assist in creating better adhesion to the window panel, as affording more surface area on which the adhesive acts.

Figure 4A:
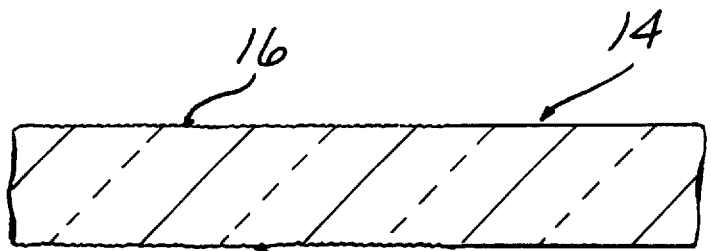
FIG. 4A shows texturizing of both surfaces of a window panel.

The texturizing may be provided on a surface against which an adhesive is to be applied in this case. Or, the texturizing can be applied on both surfaces (FIG. 4A), or just the exposed outside surface as shown in FIG. 4.

The texturizing may be very fine grained to provide a frosted look, or more roughened to create a sculpted effect, as long as sufficient distortion is produced so that visibility is obscured sufficiently to effectively mask the overlain area.

The mold surfaces 28A corresponding to the optically clear main section 18 of the window panel 14 are polished in the known manner to a degree sufficient to provide an undistorted transmission of light so as to enable normal viewing through the window panel.

The window panel 14 is advantageously molded from polycarbonate material, and is hardcoated by multistep processes now well known in the art to have much increased in service resistance to scratching.

The polycarbonate material itself effectively blocks UV light in sunlight, so that a completely masking border according to the invention can be employed instead of a blackened area since this is not required to protect the adhesive, as with glass panels, but rather a translucent band, visually concealing the adhesive joint can be used with this material.

The translucent masking of the present invention can provide an improved aesthetic appeal, as well as increased light transmission to brighten the interior of the automotive vehicle.

At the same time, any desired legend, such as a trademark/logo or other inscription 30 can be produced by omitting such texturizing in certain areas within the masking border 16 (FIG. 2). Texturized areas can also be used to form the legend 30A outside the border 16A (FIG. 3).

What is claimed is:

1. A process producing an automotive glazing window panel comprising the steps of:

molding a generally planar automotive window panel from a transparent UV blocking plastic resin;

creating a translucent masking border by texturizing a portion of a mold surface defining said automotive window panel in a band extending entirely about the perimeter of said automotive window panel so as to form a texturized perimeter band on said automotive window panel to distort light transmitted therethrough sufficiently so as to prevent observation of structural details behind said textured band while allowing transmission of light therethrough.

2. The process according to claim 1 wherein in said molding step, a polycarbonate resin is used to mold said automotive window panel.

3. The process according to claim 1 wherein a fade out is created by texturizing said automotive window panel surface in a pattern of discrete areas adjacent said texturized band, said discrete areas having intervening untexturized surface areas therebetween.

4. The process according to claim 1 further including the step of texturizing mold surface areas to create a texturized surface on said automotive window panel defining a legend masking on said automotive window panel.

5. The process according to claim 4 wherein said legend masking is located within said masking border.

* * * * *